Patented June 11, 1929.

1,716,395

UNITED STATES PATENT OFFICE.

LOUIS J. TROSTEL, OF BALTIMORE, MARYLAND, ASSIGNOR TO GENERAL REFRACTORIES COMPANY, OF PHILADELPHIA, PENNSYLVANIA, A CORPORATION OF PENNSYLVANIA.

PROCESS OF MAKING REFRACTORY COMPOSITION AND ARTICLES THEREFROM.

No Drawing.   Application filed June 7, 1926.   Serial No. 114,307.

The invention relates to a new and improved refractory composition and process for manufacturing same.

The process consists in adding to a body mix of clay material a member having inherent expansive properties. This member becomes a fractional part of the mix, but its incorporation enables the material to be wetted and shaped and thereafter dried and burned without either loss of shape or material loss of volume, within the range of very high temperatures such as are often developed in industrial furnaces.

The object of the invention is to provide a brick or other molded article of highly aluminous content that will not continue to shrink in service at temperatures at or above temperatures employed in burning the brick in the usual course of manufacture.

Another object is to provide such brick by a method of manufacture which consists in introducing a suitable quantity of the mineral cyanite or other member of the sillimanite group such as andalusite, sillimanite or westanite, into a brick mix of the highly aluminous clays such as diaspore, gibbsite, bauxite and burley, which may exist together in the raw or calcined state or both states simultaneously.

Another object is to provide such brick by introducing a highly refractory mineral which because of inherent expansive properties expands upon heating at certain temperatures to a stable form and thus neutralizes the inherent tendency of the highly aluminous clays to continue to shrink upon heating at certain temperatures.

Another object is to provide such brick by introducing a highly refractory mineral which does not increase the spalling tendency but rather increases the resistance to spalling.

Another object is to provide such brick by introducing a highly refractory mineral which increases the capacity of the brick to stand up under load at high temperatures in arches and walls without excessive deformations.

It is a well known fact that the highly aluminous clays such as those of the diaspore, gibbsite, bauxite and burley class show unusually high shrinkage upon heating at high temperatures due to the removal of mechanically and chemically contained moisture and especially because of the amorphous and colloidal form in which the clays occur in nature which upon heating cause a shrinkage into more compact and larger crystalline grains. Generally the higher the alumina content the greater the shrinkage, which it has been reported may amount to as much as 30% by volume.

In the usual process of manufacture of refractory bricks from clays of these types it is customary to introduce into the raw clay a certain amount of calcined clay of similar nature, which has been burned sufficiently to have an approximate stable grain size. The introduction of the calcined clay is made for the purpose of attempting to control shrinkage of this type of clay. These clays are generally ground separately or together, tempered with water and then pressed into brick by hand moulding or machines. Following this these brick are dried to remove moisture and burned at a temperature which causes further shrinkage.

It is impossible by the usual burning treatment in practice to remove all shrinkage of highly aluminous brick. It is further impractical to attempt to do so by increased temperature and time of burning because of the fuel expense, increased kiln repairs, lowered production and because of certain other undesirable reactions which would take place in the brick.

It is further impractical to eliminate this shrinkage by the introduction of very large amounts of calcined clay because of the difficulties in moulding which cause an extremely poorly bonded brick so friable it will not stand handling. Further, the use of a large amount of calcined clay is no insurance against shrinkage because the calcined clay still has some shrinkage in it due to the fact that the practical temperature of calcination is rarely high enough to shrink the clay to its most stable form.

Accordingly, bricks made from this type of clay by this process may continue to show shrinkage when exposed to sufficiently high temperature in industrial service resulting at times in collapse of arches, spalling and slag penetration and attack of the brick.

I have found that the introduction of small percentages of the mineral cyanite ($Al_2SiO_5$) ($Al_2O_3 \cdot SiO_2$) in proper proportion into the brick mix will produce a burned brick of practically constant volume and that this brick of new composition will maintain a practically constant volume over a temperature range comparable with that which these brick will ordinarily be subjected to in industrial furnaces.

While as mentioned, cyanite is preferred, other members of the sillimanite group may be employed such as andalusite, sillimanite or westanite. All of these compounds have the general formula $Al_2SiO_5$ ($Al_2O_3.SiO_2$), westanite being an altered silicate resembling andalusite.

These materials are preferably ground to a suitable fineness before their introduction into the mix.

Cyanite as has been established, exhibits the property of changing its specific gravity from about 3.65 in the raw state to about 3.15 after having been burned at a temperature of about 2500° F. This causes a volume increase of about 16%. The cyanite after such burning is in its most stable temperature form.

I have taken advantage of this property which cyanite exhibits of expanding upon heating to neutralize the shrinkage of the highly aluminous clays to produce a burnt refractory brick in the manner described of practically constant volume.

In preparing the mix, the aluminous clays are prepared in the usual manner, being raw or calcined or a mixture of both, and there is then added in suitable proportions, the ground cyanite. The mix is then wetted and shaped and as is usual subjected to a drying and burning operation. I have found that when the cyanite is added in sufficient quantities that the tendency of the brick to shrink on burning, is balanced by the expansive property of the cyanite. Moreover, cyanite exhibits the characteristic of maintaining the brick in its moulded form without substantial change, and in this manner enables the structure and volume of the brick to remain uniform. A brick so constructed will retain its shape and volume for all practical purpose of the industrial furnaces.

The mixture I have found most satisfactory for a brick made from diaspore clay, for instance, which is the highest in alumina content of the highly aluminous clays is about 60 to 70% crude diaspore clay, about 20 to 30% calcined diaspore clay and about 10% cyanite.

While the above mixture is the preferred one it is to be understood that the proportions and character of the ingredients may be changed. The proportions of the cyanite for instance, may be varied from 2 to 20% depending upon the amount of calcined clay in the brick mix.

It will be understood that after the burning of the brick the composition of the cyanite is altered to produce what is known as mullite having the chemical formula $3Al_2O_3.2SiO_2$, and in this form becomes a part of the finished article together with the calcined clays.

The brick having this constitution I find will be structurally firm and will have little or no shrinkage under the excessive heat conditions prevailing in an industrial furnace.

While I have found cyanite suitable for the purpose of producing a constant volume of refractory brick from highly aluminous clays I contemplate using other related minerals of the sullimanite group such as, andalusite, sillimanite and westanite.

I claim:

1. The process which comprises adding cyanite to a highly aluminous clay mix, shaping the mass and subjecting it to heat whereby expansion of the silicate will substantially balance shrinkage of the clay to produce a refractory article having a substantially constant volume.

2. An article possessing the properties of retaining its substantial shape and volume, and composed of a major mass of highly aluminous clay and a smaller quantity of cyanite.

3. A brick comprising sixty (60%) to seventy (70%) per cent crude diaspore clay, twenty (20%) to thirty (30%) per cent calcined diaspore clay, and ten per cent (10%) cyanite.

In testimony whereof I have hereunto set my hand.

LOUIS J. TROSTEL.